United States Patent [19]

Irwin

[11] 4,381,389
[45] Apr. 26, 1983

[54] OPTICALLY ANISOTROPIC MELT FORMING COPOLYESTERS

[75] Inventor: Robert S. Irwin, Wilmington, Del.

[73] Assignee: E. I. Du Pont de Nemours and Company, Wilmington, Del.

[21] Appl. No.: 398,563

[22] Filed: Jul. 15, 1982

[51] Int. Cl.³ ............................................. C08G 63/60
[52] U.S. Cl. .................................. 528/128; 528/125; 528/191; 528/193; 528/194; 528/220; 528/271
[58] Field of Search ............... 528/125, 128, 191, 193, 528/194, 220, 271

[56] References Cited

U.S. PATENT DOCUMENTS 4,188,476  2/1980  Irwin .................................. 528/128
4,226,970 10/1980  Frazer ................................ 528/128
4,232,143 11/1980  Irwin .................................. 528/128
4,232,144 11/1980  Irwin .................................. 528/128
4,269,965  5/1981  Irwin .................................. 528/128
4,335,232  6/1982  Irwin .................................. 528/128

Primary Examiner—Lester L. Lee

[57] ABSTRACT

Copolyesters useful for fibers having high elongation and modulus contain minor amounts of

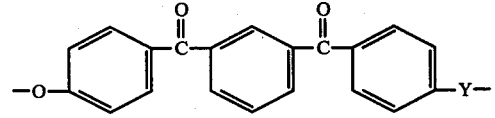

units where Y is oxygen or carbonyl.

9 Claims, No Drawings

OPTICALLY ANISOTROPIC MELT FORMING COPOLYESTERS

BACKGROUND OF THE INVENTION

1. Field of the Invention

This invention relates to certain fiberforming, melt-spinnable wholly aromatic copolyesters prepared from (a) 4-hydroxybenzoic acid, a hydroquinone, terephthalic acid and 4-hydroxy- or 4-carboxy-3'(4''-hydroxybenzoyl)benzophenone or from (b) a hydroquinone, terephthalic acid and 4-hydroxy- or 4-carboxy-3'(4''-hydroxybenzoyl)benzophenone. These copolyesters are useful for preparation of filaments having high break elongation and high modulus. They are also useful for extrusion molding or injection molding and for preparation of tough films.

2. Description of the Prior Art

Aromatic copolyesters capable of forming optically anisotropic melts are well known in the art. These polymers have yielded heat-treated fibers with combinations of high modulus and low break elongation. These properties are especially useful in tire cords or drive belts. On the other hand there are uses such as in nonwovens or in fiber/plastic composites which would benefit from a combination of high modulus and high break elongation. The preparation of anisotropic fiber-forming, melt-spinnable polyesters yielding fibers with modulus above 140 dN/tex and with elongation above 9% is a worthwhile objective.

Anisotropic melt polymers containing units derived from diketodiols are disclosed in U.S. Pat. Nos. 4,226,970 and 4,269,965 but the desired combination of high modulus and high break elongation is not disclosed in these references. It is believed that differences in structure are responsible.

SUMMARY OF THE INVENTION

The present invention is directed to melt-spinnable copolyesters of fiber-forming molecular weight that exhibit optical anisotropy in the melt and consist essentially of (a) Units I, II, III and IV or (b) Units I, II and III, said units having the structural formulas:

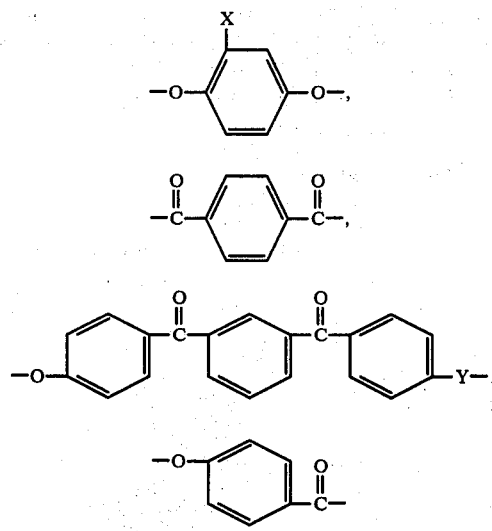

where X is selected from the group consisting of hydrogen, halo- (preferably chloro-) or lower alkyl (preferably methyl), or aryl (preferably phenyl); Y is selected from the group consisting of oxygen and carbonyl; and wherein said copolyesters consisting essentially of Units I, II, III and IV contain from about 10 to 15 mole % of Unit I, from about 10 to 20 mole % of Unit II, from about 10 to 15 mole % of Unit III and from about 50 to 70 mole % of Unit IV; and wherein said copolyesters consisting essentially of Units I, II and III contain from about 40 to 45 mole % of Unit I, from about 40 to 50 mole % of Unit II and from about 10 to 15 mole % of Unit III. In each case the number of dioxy units in the copolyester is substantially equal to the number of dicarbonyl units.

One group of preferred copolyesters of the invention consists essentially of Units I, II, III and IV where in Unit I, X is hydrogen or chloro-. Other preferred copolyesters of the invention consist essentially of Units I, II and III where in Unit I, X is chloro- or phenyl-. Melt-spun and heat-strengthened filaments of such polyesters as well as films and molded or extruded articles from such polyesters are included in the invention.

DETAILED DESCRIPTION OF THE INVENTION

Unit I in the copolyesters of the invention is 1,4-dioxyphenylene, lower alkyl-, halo-, or aryl-1,4-dioxyphenylene. Methyl and phenyl groups exemplify the preferred lower alkyl and aryl groups, respectively. Unit II is the terephthaloyl radical. Unit III is the oxy-1,4-phenylene-carbonyl-1,3-phenylene-carbonyl-1,4-phenylene-oxy radical or the oxy-1,4-phenylene-carbonyl-1,3 phenylene-carbonyl-1,4-phenylene-carbonyl radical. Unit IV is p-oxybenzoyl.

The number of dioxy units present in the copolyester is substantially equal to the number of dicarbonyl units. Mole % is calculated on the basis of total moles of units present, i.e. [I+II+III+IV].

Suitable precursors for Unit I include hydroquinone or the corresponding substituted hydroquinones. This precursor is generally employed in the form of the diacetate. Terephthalic acid is a suitable precursor for Unit II while 4-hydroxybenzoic acid in the form of the monoacetate is useful for providing Unit IV. The diacetate of 4-hydroxy-3'(4''-hydroxybenzoyl)benzophenone or the monoacetate of 4-carboxy-3'(4''-hydroxybenzoyl)benzophenone can provide Unit III.

J. Am. Chem. Soc. 60 pp 2283–2285 (October, 1938) discloses preparation of 4-hydroxy-3'(4''-hydroxybenzoyl)benzophenone. The monoacetate of 4-carboxy-3'(4''-hydroxybenzoyl)benzophenone is prepared as follows:

97.0 g (0.40 mole) of 3(4'-hydroxybenzoyl)benzoic acid was condensed with 37.0 g (0.40 mole) of toluene in a mixture of 200 g of HF and 95.0 g (1.40 moles) of BF$_3$ in a 1 liter Hastalloy ® C shaker tube with agitation for 18 hours at 30° C. The reaction mixture was poured onto ice, the product collected, washed with water, suspended in water and neutralized with aqueous ammonia to a pH of 7–8, collected again, dried, and recrystallized twice from ethanol/water (1/1 by volume) by dissolving in ethanol, filtering, then diluting with water to provide 3(4''-hydroxybenzoyl)4'-methylbenzophenone. Melting point is 175.5°–176° C. Calculated for C$_{21}$H$_{16}$O$_3$: C, 79.7%; H, 5.10%. Found: C, 79.6%, H, 5.10%.

3(4''-Hydroxybenzoyl)4'-methylbenzophenone (79.0 g, 0.25 mole) was oxidized with 53 g (0.53 mole) chromic anhydride (CrO$_3$) in a mixture of acetic acid (500 ml), concentrated $H_2SO_4$ (1.5 g) and acetic anhydride (178 g, 1.75 moles) in a flask equipped with stirrer, thermometer, condenser and portal for addition of ingredients. All ingredients except $CrO_3$ were added, and the mixture stirred overnight, then at 60° C. again overnight, to ensure actylation of the phenolic group. The $CrO_3$ was added in increments of about 10 g such that with intermittent cooling a temperature of 50° C. was maintained. After subsequent addition of 200 ml more acetic acid and overnight stirring at ambient temperature, the reaction mixture was diluted to a total volume of 2 liters with ice and water, stirred, the product collected, washed with water and dried. Crystallization twice from acetic acid yielded 71% of 4-carboxy-3'(4''-acetoxybenzoyl)benzophenone, m.p., 241°-242° C. Calculated for $C_{23}H_{16}O_6$: C, 71.1; H, 4.15. Found: C, 71.3; H, 4.31.

The precursor reactants are generally combined in proportions corresponding to the molar proportions of the units desired in the copolyester products except that it is preferred to use a molar excess, indicated in the examples as (%) of the more volatile diacetate of hydroquinone, or substituted hydroquinone.

Conventional polymerization techniques may be employed such as described in the aforementioned U.S. Pat. No. 4,118,372 and more particularly in the examples described below. In general, a mixture of monomers is heated with stirring, under nitrogen in a 250 ml 3-necked flask or polymerization tube in a Wood's metal bath or other suitable heating medium from approximately 250° C. to 330°-380° C. Polymerization is continued for up to a total of 0.5 to one hour or longer if necessary until a polymer of fiber-forming molecular weight is obtained. Usually a vacuum is applied to obtain a final product with high molecular weight. The copolyesters of the invention exhibit optical anisotropy in the melt as described in U.S. Pat. No. 4,118,372.

FILAMENT PREPARATION

The copolyesters of the invention are spun into filaments by conventional melt-spinning techniques without substantial degradation. In the examples below, filaments were prepared by melt-spinning into a quenching atmosphere of air or nitrogen and collected at a windup speed specified in the example. Melt pumping speed is adjusted to give the approximate linear density (D) shown in the tables at the stated windup rate.

As used herein, the term "as-spun fiber" refers to a fiber which has not been drawn or heat treated after extrusion and normal windup.

HEAT TREATMENT AND UTILITY

Following collection, samples of undrawn (as-spun) monofilament were heat-treated in essentially relaxed condition in an oven as taught in Luise U.S. Pat. No. 4,183,895. Heating was in a purged nitrogen atmosphere with temperature increased in stages. Typically, temperature was raised from room temperature to 200° C. in 2 hours, then to 304° C. in another 7 hours, and finally maintained at 304° C. for an additional 7 to 16 hours. The final temperature, which is usually the maximum temperature, is critical for achieving maximum break elongation and high modulus.

The flow temperature of the filaments is a function of thermal history and molecular weight. Crystallization and molecular weight growth during heat treatment can increase the flow temperature of the filaments, making possible heat treatment temperatures in excess of the original polymer flow temperature. The maximum temperature for optimum development of high break elongation and high modulus should be close to or above the initial flow temperature, preferably above the initial flow temperature. Higher molecular weights favorably affect the development of high break elongation. Higher spin stretch factors also favor the development of high break elongation (determined from orifice diameter and tex as-spun).

The heat treated fibers of this invention are useful for a variety of applications such as in ropes or in nonwoven sheets, but it is believed they are most useful in reinforcement of plastic composites where the composite is expected to absorb a high amount of energy under stress before failure.

TEST METHODS

Inherent viscosity ($n_{inh}$), a measure of molecular weight, was computed from $n_{inh}=(\ln n_{rel})/C$ where $n_{rel}$ is the relative viscosity and C is solution concentration in grams of polymer per deciliter of solvent. Relative viscosity is the ratio of polymer solution flow time to solvent flow time in a capillary viscometer at 30° C. The solvent employed was a mixture of 7.5% trifluoroacetic acid/17.5% methylene chloride/12.5% dichlorotetrafluoroacetone hydrate/12.5% perchloroethylene/50% p-chlorophenol (all percentages by volume). The concentration was 0.5 g polymer per deciliter of solvent.

The polymers were characterized by polymer flow temperature, meaning the lowest temperature at which polymer was observed to be molten, showing flow properties and allowing fibers to be drawn from the melt. The filament flow temperatures were determined as in U.S. Pat. No. 4,183,895, Col. 11.

Monofilament tensile properties were measured in accordance with A.S.T.M. 2101 Part 33 (1980) using a recording stress-strain analyzer at 70° F. (21.1° C.) and 65% relative humidity. Gauge length was 1.0 in (2.54 cm), and rate of elongation was 10%/min. Results are reported as D/T/E/M or T/E/M where D is linear density in tex units, T is breeak tenacity in dN/tex, E is elongation-at-break expressed as the percentage by which initial length increased, and M is initial tensile modulus in dN/text. Since linear density is normally substantially unchanged by heat-treatment, it is reported only for the as-spun filament. Average tensile properties for five filament samples are reported.

EXAMPLES

The same general procedure was used in all the examples. It should be understood that the results reported below are believed to be representative of what can be obtained and do not constitute all the runs performed involving the indicated reactants. Unfamiliarity with the reaction requirements of the system, use of impure reactants or inappropriate heat treatment conditions may cause other results such as lower elongation or modulus to be obtained.

In the examples, the diacetate of the dihydric phenols and the monoacetate of the hydroxyacid was used. The terephthalic acid was used as such rather than as esters or other derivatives.

In the examples below, the following code is employed to identify the polymerization reactants or functional equivalents as well as the repeat units provided by such reactants.

HQ—hydroquinone

CHQ—chlorohydroquinone
PHQ—phenylhydroquinone
TPA—terephthalic acid
HBA—4-hydroxybenzoic acid
DKDH—4-hydroxy-3'(4''-hydroxybenzoyl)benzophenone
DKHA—4-carboxy-3'(4''-hydroxybenzoyl)benzophenone The monomer ingredients were added in substantially the same molar ratios as desired in the final polymer except that an excess (usually 4 to 7%) of acetylated dihydric phenol was generally used. The resultant polymer is identified, for example, as CHQ/TPA/DKDH/HBA (10/20/10/60) meaning it contained 10 mole % of chloro-1,4-dioxyphenylene units (from the diacetate of chlorohydroquinone), 20 mole % of terephthaloyl units (from terephthalic acid), etc. (excesses of diacetates are not included in these percentages).

The 3-necked flask or polymer tube was fitted with: (1) a glass stirrer extending through a pressure-tight resin bushing, (2) a nitrogen inlet, and (3) a short column leading to a water- or air-cooled condenser with a flask for collecting acetic acid by-product. An attachment for application of vacuum was provided at the end of the condenser. An electrically heated Wood's metal bath or a boiling liquid vapor bath mounted for vertical adjustment was used for heating. The reaction mixture was heated to increasing temperatures with stirring at atmospheric pressure under nitrogen purge until essentially all the acetic acid had evolved. Then, vacuum was applied and pressure was reduced gradually from atmospheric to less than 1 mm of mercury (133.3 Pa). Heating under vacuum at less than 1 mm mercury pressure was then continued until viscosity had increased to a level believed satisfactory for melt-spinning. The cooled and solidified polymer was comminuted, and a portion was molded into a cylindrical plug for melt spinning.

EXAMPLE 1

Filaments from Copolyesters having the Composition CHQ/TPA/DKDH/HBA (10/20/10/60)

A polyester was prepared by heating the following ingredients in a 3-necked flask as described previously:

| | | |
|---|---|---|
| 81.0 g | 4-acetoxybenzoic acid | (.450 mole) |
| 18.0 g | chlorohydroquinone diacetate (7% excess) | (.0787 mole) |
| 30.75 g | 4-hydroxy-3'(4''-hydroxybenzoyl) benzophenone diacetate | (.0764 mole) |
| 24.9 g | terephthalic acid | (.150 mole) |

In the above mixture it is assumed that all of the excess acetate should be provided through the chlorohydroquinone because of its greater volatility and tendency to distill. The flask was heated from 200° to 330° C. in 32 min. Vacuum was then applied and the flask heated to 345° C. in 15 minutes. The resulting polymer softened at 270° C. and fibers could be pulled from a melt at 300° C. The inherent viscosity was 1.46. Polymer flow temperature as measured in the thermo optical test of Schaefgen U.S. Pat. No. 4,118,372 was 278° C.

The polymer was spun through a five-hole spinneret with orifices 0.23 mm in diameter and 1.60 mm in length with cell temperature 304° C., spinneret temp 305° C. and wind-up speed 914 meters/min. [1000 ypm].

Properties of the as-spun filaments are shown in Table I along with properties of yarns heat-treated in a nitrogen atmosphere at various maximum temperatures.

Yarns heated at a maximum 304° C. had high break elongation (14.4%) and high modulus (183 dN/tex).

TABLE I

PROPERTIES OF FILAMENTS FROM CHQ/TPA/TKDH/HBA (10/20/10/60)

| Treatment | Tex per Filament | Tenacity dN/tex | Elongation at Break % | Initial Modulus dN/tex |
|---|---|---|---|---|
| As-spun | 0.47 | 2.4 | 1.2 | 275 |
| Max. temp. 298° C. | 0.47 | 3.3 | 8.7 | 208 |
| Max. temp. 304° C. | 0.45 | 3.4 | 14.4 | 184 |
| Max. temp. 325° C. | 0.42 | 3.4 | 4.1 | 183 |

The polymer of this example may be melt extruded as film or molded with heat and pressure into various shaped articles.

EXAMPLE 2

Repeating the Polymer of Example 1 with Higher Inherent Viscosity

The polymerization of Example 1 was repeated using the same ingredients. The flask was heated from 200° to 330° C. in 30 minutes. Vacuum was then applied and heating was continued to 345° C. in 53 minutes. The inherent viscosity was 2.07, which is higher than in Example I.

The polymer was melt spun through a five-hole spinneret having orifices 0.36 mm in diameter and 0.23 mm in length with cell temperature 367° C. and spinneret temperature 371° C. and a wind-up speed 183 m/min.

Properties of the as-spun filaments are shown in Table 2. Properties after various maximum heat treatment temperatures are shown. Elongations above 9% at break were obtained for all heat treatments with maximum temperature in the range 290°–310° C. Initial moduli for these filaments were 144 to 212 dN/tex.

TABLE 2

PROPERTIES OF FILAMENTS FROM CHQ/TPA/TKDH/HBA (10/20/10/60) SPUN FROM POLYMER WITH INHERENT VISCOSITY 2.07

| Treatment | Tex per Filament | Tenacity dN/tex | Elongation at Break % | Initial Modulus dN/tex |
|---|---|---|---|---|
| As-spun | 1.3 | 3.1 | 1.6 | 244 |
| Max. heat-treatment | | | | |
| 290° C. | 1.2 | 4.2 | 11.3 | 144 |
| 298° C. | 1.3 | 4.0 | 27.6 | 212 |
| 310° C. | 1.3 | 3.6 | 14.8 | 192 |
| 315° C. | 1.2 | 3.6 | 7.6 | 203 |

EXAMPLE 3

Filaments from Copolyester having the Composition HQ/TPA/DKDH/HBA (10/20/10/60)

A polyester was prepared by heating the following ingredients in a polymer tube as described earlier:

| | | |
|---|---|---|
| 21.6 g | 4-acetoxybenzoic acid | (.120 mole) |
| 8.2 g | 4-hydroxy-3'(4''-hydroxybenzoyl) benzophenone diacetate (7.1% excess) | (.0204 mole) |
| 4.07 g | hydroquinone diacetate | (.0210 mole) |

-continued

| | |
|---|---|
| 6.64 g terephthalic acid | (.0400 mole) |

The tube was heated from 284° C. to 346° C. in 44 minutes. Vacuum was applied for another 40 minutes at 346°–360° C. Fibers could be pulled from the melt at 354° C. Inherent viscosity was 1.43. The polymer was optically anisotropic in the melt.

A filament was melt spun from a one-hole spinneret with a hole diameter of 0.23 mm with a cell temperature of 358° C. at a wind-up speed of 549 m/min. As-spun properties and properties after heat-treatment are shown in Table 3. This polymer having hydroquinone in place of the chlorohydroquinone of Examples 1 and 2 still provided heat-treated fibers with high break elongation and modulus.

TABLE 3
PROPERTIES OF FILAMENTS FROM
HQ/TPA/DKDH/HBA (10/20/10/60)

| Treatment | Tex per Filament | Tenacity dN/tex | Elongation at Break % | Initial Modulus dN/tex |
|---|---|---|---|---|
| As-spun | 0.71 | 1.2 | 0.8 | 46 |
| Heat treated: | 0.99 | 3.7 | 15.0 | 177 |
| 25–200° C., 2 hr. | | | | |
| 200–306° C., 7 hr. | | | | |
| 304° C., 7 hr. | | | | |
| Heat treated: | 0.79 | 3.8 | 11.6 | 198 |
| 25–235° C., 2 hr. | | | | |
| 235–270° C., 2 hr. | | | | |
| 235–270° C., 2 hr. | | | | |
| 270–305° C., 2 hr. | | | | |
| 305–320° C., 16 hr. | | | | |

EXAMPLE 4

Filaments from Copolyester having the Composition
PHQ/TPA/DKDH (40/50/10)

The following ingredients were charged to a polymer tube:

| | |
|---|---|
| 22.5 g phenylhydroquinone diacetate (4.5% excess) | (.0832 mole) |
| 8.2 g 4-hydroxy-3'(4''-hydroxybenzoyl) benzophenone diacetate | (.0204 mole) |
| 16.6 g terephthalic acid | (.100 mole) |

The tube was heated from 210° to 350° C. in 28 minutes. Vacuum was then applied and temperature continued at 350° C. for 7 min. Fibers could be pulled from the melt at 330° C. The inherent viscosity was 1.20.

A melt spun mono-filament was prepared from a spinneret having an orifice diameter of 0.23 mm with spinneret temperature at 260° C. and wind-up speed at 549 m/min. Properties of the resulting filament varied depending upon maximum heat-treatment temperatures. Highest break elongation (11.4%) was obtained with the maximum heat-treatment temperature at 277° C. as shown in Table 4. Heat treatment temperatures above and below 277° C. gave fibers with lower values.

TABLE 4
PROPERTIES OF FILAMENTS FROM
PHQ/TPA/DKDH (40/50/10)

| Treatment | Tex per Filament | Tenacity dN/tex | Elongation at Break % | Initial Modulus dN/tex |
|---|---|---|---|---|
| As-spun | 0.51 | 2.9 | 3.3 | 166 |
| Max. heat treatment temp: | | | | |
| 292° C. | 0.50 | 4.0 | 8.6 | 144 |
| 286° C. | 0.50 | 4.2 | 9.9 | 159 |
| 277° C. | 0.50 | 4.0 | 11.4 | 160 |
| 267° C. | 0.41 | 3.3 | 6.9 | 148 |
| 260° C. | 0.47 | 3.7 | 6.0 | 163 |
| 258° C. | 0.55 | 3.0 | 3.4 | 152 |

EXAMPLE 5

Filaments from a Polyester having the Composition
CHQ/TPA/DKHA/HBA (14/14/12/60)

The following ingredients were heated in a polymer tube under a stream of dry nitrogen with stirring:

| | |
|---|---|
| 5.65 g 4-carboxy-3'(4''-hydroxybenzoyl)-benzophenone acetate | (.0145 mole) |
| 4.03 g chlorohydroquinone diacetate (4.8% excess) | (.0176 mole) |
| 2.79 g terephthalic acid | (.0168 mole) |
| 12.90 g 4-hydroxybenzoic acid acetate | (.0716 mole) |

The tube was heated from 200° to 350° C. in 60 minutes; then vacuum was applied and heating was continued at 350° C. for 5 minutes. The polymer had an inherent viscosity of 1.91. Polymer flow temperature was 319° C. It was optically anisotropic in the melt.

A molded plug was heated to 308° C. and melt spun through a spinneret orifice 0.23 mm in diameter at a temperature of 320° C. with a wind-up speed of 549 m/min.

Properties of the fibers as-spun and after heat treatment are given in Table 5.

TABLE 5
PROPERTIES OF FILAMENTS FROM
CHQ/TPA/DKHA/HBA (14/14/12/60)

| Treatment | Tex per Filament | Tenacity dN/tex | Elongation at Break % | Initial Modulus dN/tex |
|---|---|---|---|---|
| As-spun | 0.59 | 2.5 | 1.3 | 267 |
| Heat treated: | 0.55 | 4.0 | 9.8 | 241 |
| 200–275° C., 7 hrs. | | | | |
| 275° C., 16 hrs. | | | | |

EXAMPLE 6

Filaments from Polyester having the Composition
CHQ/TPA/DKHA (43/43/14)

The following ingredients were heated in a polymer tube:

| | |
|---|---|
| 5.49 g 4-carboxy-3'(4''-hydroxybenzoyl) benzophenone acetate | (.0141 mole) |
| 10.32 g chlorohydroquinone diacetate (5% excess) | (.0451 mole) |
| 7.14 g terephthalic acid | (.0430 mole) |

The tube was heated from 210° to 340° C. in 65 min.; then vacuum was applied and heating was continued for 10 minutes at 340° C. The resulting fiber had an inherent viscosity of 1.32.

The material was melt-spun at 325° C. with a wind-up speed of 549 m/min. using a single orifice 0.23 mm in diameter and 1.60 mm long. The preferred heat-treatment method was to increase the temperature progressively from 200° to 268° C. in 7 hours and then to heat at 268° C. for 16 hours in a purged nitrogen atmosphere.

The fibers exhibited the following properties:

|  | As-spun | Heat-treated |
| --- | --- | --- |
| Tex per filament | 0.20 | 0.22 |
| Tenacity, dN/tex | 2.0 | 3.4 |
| Elongation at break, % | 1.5 | 13.7 |
| Initial Modulus, dN/tex | 189 | 151 |

I claim:

1. A copolyester consisting essentially of (a) Units I, II, III and IV or (b) Units I, II and III, said units having the structural formulas:

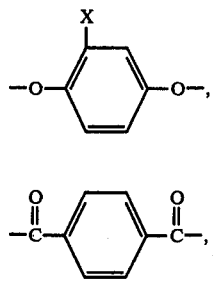

I

II

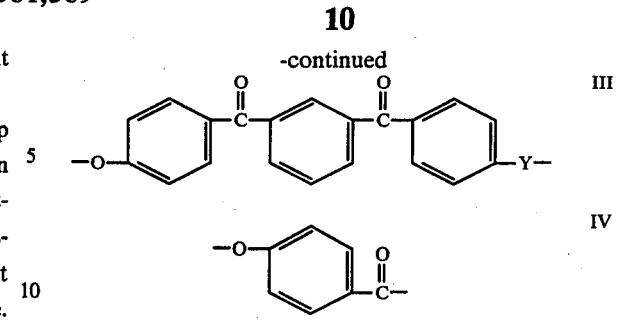

III

IV where x is selected from the group consisting of hydrogen, halo-, lower alkyl, and aryl, Y is selected from the group consisting of oxygen and carbonyl and wherein said copolyesters consisting essentially of Units I, II, III and IV contain from about 10 to 15 mole % of Unit I, from about 10 to 20 mole % of Unit II, from about 10 to 15 mole % of Unit III and from about 50 to 70 mole % of Unit IV; and wherein said copolyesters consisting essentially of Units I, II and III contain from about 40 to 45 mole % of Unit I, from about 40 to 50 mole % of Unit II and from about 10 to 15 mole % of Unit III.

2. A copolyester according to claim 1 consisting essentially of Units I, II, III and IV where Unit I is 1,4-dioxyphenylene or chloro-1,4-dioxyphenylene.

3. A copolyester according to claim 1 consisting essentially of Units I, II and III where Unit I is chloro- or phenyl-1,4-dioxyphenylene.

4. A copolyester according to claim 1 where in Unit III, Y is oxygen.

5. A copolyester according to claim 1 where in Unit III, Y is carbonyl.

6. A fiber of the copolyester of claim 1.

7. A heat-treated fiber of claim 6 having an elongation at break of at least 9% and a modulus of at least 140 dN/tex.

8. A film of the copolyester of claim 1.

9. A molded or extruded article of the copolyester of claim 1.

* * * * *